(12) United States Patent
Li et al.

(10) Patent No.: US 12,488,557 B2
(45) Date of Patent: Dec. 2, 2025

(54) IMAGE AUGMENTATION DEVICE AND METHOD

(71) Applicant: , New Taipei (TW)

(72) Inventors: Yung-Hui Li, New Taipei (TW);
Shen-Hsuan Liu, New Taipei (TW);
Wenny Ramadha Putri, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 472 days.

(21) Appl. No.: 18/069,209

(22) Filed: Dec. 20, 2022

(65) Prior Publication Data

US 2023/0196718 A1    Jun. 22, 2023

Related U.S. Application Data

(60) Provisional application No. 63/265,784, filed on Dec. 21, 2021.

(51) Int. Cl.
*G06V 10/46*        (2022.01)
*G06N 3/08*         (2023.01)
(Continued)

(52) U.S. Cl.
CPC .............. *G06V 10/46* (2022.01); *G06T 3/40* (2013.01); *G06T 5/50* (2013.01); *G06V 10/242* (2022.01);
(Continued)

(58) Field of Classification Search
CPC ...... G06V 10/46; G06V 10/242; G06V 10/82; G06V 10/44; G06T 3/40; G06T 5/50;
(Continued)

(56) References Cited

U.S. PATENT DOCUMENTS

| 12,147,496 | B1* | 11/2024 | Callari ............... G06F 18/2148 |
| 2012/0288186 | A1* | 11/2012 | Kohli .................. G06V 10/772 |
| | | | 382/159 |

(Continued)

FOREIGN PATENT DOCUMENTS

| CN | 111666994 A | 9/2020 |
| CN | 111754518 A | 10/2020 |

(Continued)

OTHER PUBLICATIONS

Golnaz Ghiasi et al., Simple Copy-Paste is a Strong Data Augmentation Method for Instance Segmentation, Jun. 23, 2021, Google Research, Brain Team, pp. 1-13 (Year: 2021).*

(Continued)

*Primary Examiner* — Chineyere Wills-Burns
*Assistant Examiner* — Lucius Cameron Gree Allen
(74) *Attorney, Agent, or Firm* — CKC & Partners Co., LLC

(57) ABSTRACT

An image augmentation device is provided, which includes a memory and a processor. The processor is configured for performing following operations: extracting a first object contour from a first image mask, wherein the first object contour corresponds to a first label; superimposing the first object contour to a superimposed region in a second image mask according to an augmentation parameter to generate a third image mask, wherein the augmentation parameter includes a contour scaling parameter, a contour moving distance, a contour rotation angle and a range which can be superimposed, and the third image mask includes the first object contour and a second object contour in the second image mask; and generating a sample image which corresponds to according to the first object contour and the second object contour in the third image mask by a generative adversarial network model for performing machine learning.

20 Claims, 8 Drawing Sheets

(51) Int. Cl.
  *G06T 3/40* (2024.01)
  *G06T 5/50* (2006.01)
  *G06T 7/13* (2017.01)
  *G06T 11/60* (2006.01)
  *G06V 10/24* (2022.01)
  *G06V 10/44* (2022.01)
  *G06V 10/82* (2022.01)

(52) U.S. Cl.
  CPC .... *G06V 10/82* (2022.01); *G06T 2207/20081* (2013.01); *G06T 2207/20221* (2013.01)

(58) Field of Classification Search
  CPC . G06T 2207/20081; G06T 2207/20221; G06T 11/60; G06T 7/13; G06T 2207/20084; G06N 3/08
  USPC .......................................................... 382/203
  See application file for complete search history.

(56) References Cited

U.S. PATENT DOCUMENTS

| | | | |
|---|---|---|---|
| 2016/0343152 A1* | 11/2016 | Hay | G06T 11/60 |
| 2019/0294661 A1* | 9/2019 | Sarkar | G06V 20/70 |
| 2021/0309248 A1* | 10/2021 | Choe | G06N 3/04 |
| 2021/0383538 A1 | 12/2021 | Deasy et al. | |

FOREIGN PATENT DOCUMENTS

| | | |
|---|---|---|
| CN | 112085160 A | 12/2020 |
| CN | 112464939 A | 3/2021 |
| CN | 113012249 A | 6/2021 |
| CN | 113327221 A | 8/2021 |
| CN | 113762327 A | 12/2021 |
| TW | I728465 B | 5/2021 |

OTHER PUBLICATIONS

Tal Remez et al., Learning to Segment via Cut-and-Paste, 2018, Google, pp. 1-16 (Year: 2018).*

Yukang Chen et al., Scale-aware Automatic Augmentation for Object Detection, Mar. 31, 2021, The Chinese University of Hong Kong, pp. 1-12 (Year: 2021).*

Mate Kisantal et al., Augmentation for small object detection, Feb. 19, 2019, Tensorflight, Inc., pp. 1-15 (Year: 2019).*

Jason Brownlee, How to Configure Image Data Augmentation in Keras, Jul. 5, 2019, Machine Learning Mastery (Year: 2019).*

Olsson, Viktor, et al. "Classmix: Segmentation-based data augmentation for semi-supervised learning." Proceedings of the IEEE/CVF winter conference on applications of computer vision. Nov. 29, 2020. (Year: 2020).*

* cited by examiner

IMAGE AUGMENTATION DEVICE AND METHOD

CROSS-REFERENCE TO RELATED APPLICATION

This application claims priority to U.S. Provisional Application Ser. No. 63/265,784 filed Dec. 21, 2021, which is herein incorporated by reference in its entirety.

BACKGROUND

Field of Disclosure

The present disclosure relates to an image augmenting technology, and more particularly to an image augmentation device and method.

Description of Related Art

In the prior art, when training a machine learning model, in addition to the training model structure will affect identification and identification ability, the most critical is integrity of training data. However, in a preprocessing stage, it often takes a lot of manpower to collect a large quantity of samples to label a large quantity of samples, especially masks of labels with high labeling costs. Therefore, how to use a small quantity of labeled samples to maintain integrity of the training data is a problem that those skilled in the art are eager to solve.

SUMMARY

One aspect of the present disclosure discloses an image augmentation device, which comprises a memory and a processor. The memory is configured for storing a first image mask and a second image mask. The processor is connected to the memory to perform following operations: extracting a first object contour from the first image mask, wherein the first object contour corresponds to a first label; superimposing the first object contour to a superimposed region in the second image mask according to an augmentation parameter to generate a third image mask, wherein the augmentation parameter comprises a contour scaling parameter, a contour moving distance, a contour rotation angle and a range which can be superimposed, and the third image mask comprises the first object contour and a second object contour in the second image mask; and generating a sample image which corresponds to according to the first object contour and the second object contour in the third image mask by a generative adversarial network model for performing machine learning.

Another aspect of the present disclosure discloses an image augmentation method, which comprises: extracting a first object contour from a first image mask, wherein the first object contour corresponds to a first label; superimposing the first object contour to a superimposed region in a second image mask according to an augmentation parameter to generate a third image mask, wherein the augmentation parameter comprises a contour scaling parameter, a contour moving distance, a contour rotation angle and a range which can be superimposed, and the third image mask comprises the first object contour and a second object contour in the second image mask; and generating a sample image which corresponds to according to the first object contour and the second object contour in the third image mask by a generative adversarial network model for performing machine learning.

Another aspect of the present disclosure discloses an image augmentation device, which comprises a memory and a processor. The memory is configured for storing a first image mask. The processor is connected to the memory to perform following operations: extracting a first object contour from the first image mask, wherein the first object contour corresponds to a first label; superimposing the first object contour to a superimposed region in the first image mask according to an augmentation parameter to generate a second image mask, wherein the augmentation parameter comprises a contour scaling parameter, a contour moving distance, a contour rotation angle and a range which can be superimposed, and the second image mask comprises the first object contour and the first object contour which is superimposed to; and generating a sample image which corresponds to according to the first object contour and the first object contour which is superimposed to in the second image mask by a generative adversarial network model for performing machine learning.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION

Figure 1:
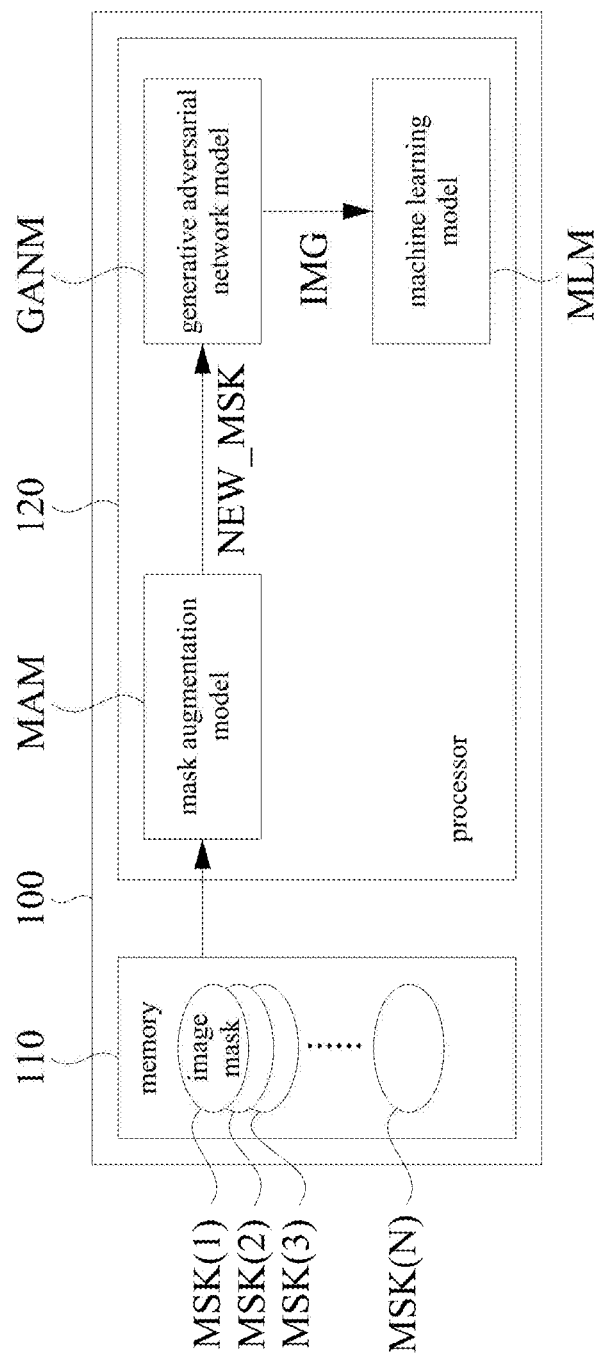
FIG. 1 is a block diagram of an image augmentation device in the present disclosure.

Reference will now be made in detail to the present embodiments of the disclosure, examples of which are illustrated in the accompanying drawings. Wherever possible, the same reference numbers are used in the drawings and the description to refer to the same or like parts.

Referring to FIG. 1, FIG. 1 is a block diagram of an image augmentation device 100 in the present disclosure. In one embodiment, the image augmentation device 100 includes a memory 110 and a processor 120. The processor 120 is connected to the memory 110.

In some embodiments, the image augmentation device 100 can be established by a computer, a server, or a data processing center. In some embodiments, the memory 120 can be implemented by using a memory cell, a flash memory, a read-only memory, a hard disk, or any equivalent storage device. In some embodiments, the processor 130 can be implemented by a processing unit, a central processing unit, or a computing unit.

In some embodiments, the image augmentation device 100 is not limited to include the memory 110 and the processor 120, the image augmentation device 100 can further include other components required for operation and application, for example, the image augmentation device 100 can further include an output interface (e.g., a display panel for displaying information), an input interface (e.g., a touch panel, a keyboard, a microphone, a scanner or a flash memory reader), and a communication circuit (e.g., a Wi-Fi communication module, Bluetooth communication module, wireless telecommunications network communication module, etc.).

As shown in FIG. 1, the memory 110 stores image masks MSK(1)-MSK(N), where N can be any positive integer and is not particularly limited. In one embodiment, the image augmentation device 100 can perform data augmentation and label classification operations according to the image masks MSK(1)-MSK(N). The detailed methods will be described in detail in the following paragraphs. The data augmentation is a technology that increases the quantity of training data, also known as data enhancement or data supplementation. When performing machine learning training, a large quantity of training data is often required. Using the data augmentation technology can generate more augmentation training data based on the original training data, thereby ensuring that over-fitting does not occur when training the machine learning model. In addition, using the data augmentation technology can also greatly improve prediction accuracy of the machine learning model.

In some embodiments, the image masks MSK(1)-MSK(N) can be masks (which can be regarded as labeled images) generated by performing feature extraction operation on multiple images. In some embodiments, the above-mentioned feature extraction operation can be performed based on mask region-based convolutional neural networks (Mask R-CNN) or U-net model. In some embodiments, the image masks MSK(1)-MSK(N) can include a binary mask, a semantic region of interesting (ROI) mask or a combination of the above, where the semantic ROI mask can be a 3 degree of freedom (DOF) mask or a multiple DOF mask.

For example, the feature extraction operation can be performed on the image to perform binary classification on pixels in the image, thereby determining which regions are ROIs having features and which regions are non-ROI having no features. In this way, the ROI can be assigned a weight of 1 (i.e., label), and non-ROI can be assigned a weight of 0. In this way, according to the weight of the ROI and the weight of the non-ROI, the ROI and the non-ROI can be set to white and black respectively to generate a black and white image, and this black and white image can be used as the binary mask.

In another example, the feature extraction operation can be performed on the image to perform multivariate classification on the pixels in the image, thereby determining which regions have similar features. In this way, regions with different features can be assigned weights of different values. In this way, regions with different features can be set to different RGB colors according to these weights to generate an RGB image, and this RGB image can be used as the above-mentioned multiple DOF mask.

It should be noted that although the black and white image and the RGB image are used as examples of the image masks MSK(1)-MSK(N), an image in other color spaces (e.g., grayscale images) can also be selected as the image masks MSK(1)-MSK(N).

As shown in FIG. 1, the processor 120 is coupled to the memory 110, and the processor 120 generates a generative adversarial network (GAN) model GANM based on corresponding software or firmware instruction programs. In some embodiments, the processor 120 can further run a mask augmentation model MAM and the machine learning model MLM based on corresponding software or firmware instruction programs.

In some embodiments, the mask augmentation model MAM can perform mask augmentation on the image masks MSK(1)-MSK(N) to generate various new image masks NEW_MSK, and the detailed method will be described in following paragraphs. It should be noted that a quantity of these new image masks NEW_MSK can be much larger than N (e.g., N can be 1500 and the quantity of the new image masks NEW_MSK can be 100000).

In some embodiments, the GAN model GANM can be used to perform data augmentation based on the input new image mask NEW_MSK to generate multiple sample images which is augmented. For example, in the preprocessing stage, a pix2pix algorithm can be used to pre-train the GAN model GANM according to multiple preset masks and multiple preset images respectively corresponding to the preset masks. In this way, a large quantity of new image masks NEW_MSK generated by the mask augmentation model MAM can be input to the GAN model GANM to generate a large quantity of sample images IMG corresponding to these new image masks NEW_MSK (i.e., the new image mask NEW_MSK can indicate labels of the sample image IMG), the detailed method will be described in following paragraphs. Therefore, a large quantity of labeled sample images can be generated through the mask augmentation model MAM and the GAN model GANM according to a small quantity of image masks, which will expand the quantity of the training samples and solve the problem of the insufficient training samples.

In some embodiments, the machine learning model MLM can be any machine learning model (e.g., masked region convolutional neural network model or U-net model, etc.), and there is no special limitation.

As shown in FIG. 1, the processor 120 can train the machine learning model MLM based on the new image masks NEW_MSK and the corresponding sample images IMG. In other words, a large quantity of the new image masks NEW_MSK generated by the image augmentation device 100 can be applied to any machine learning model.

Figure 2:
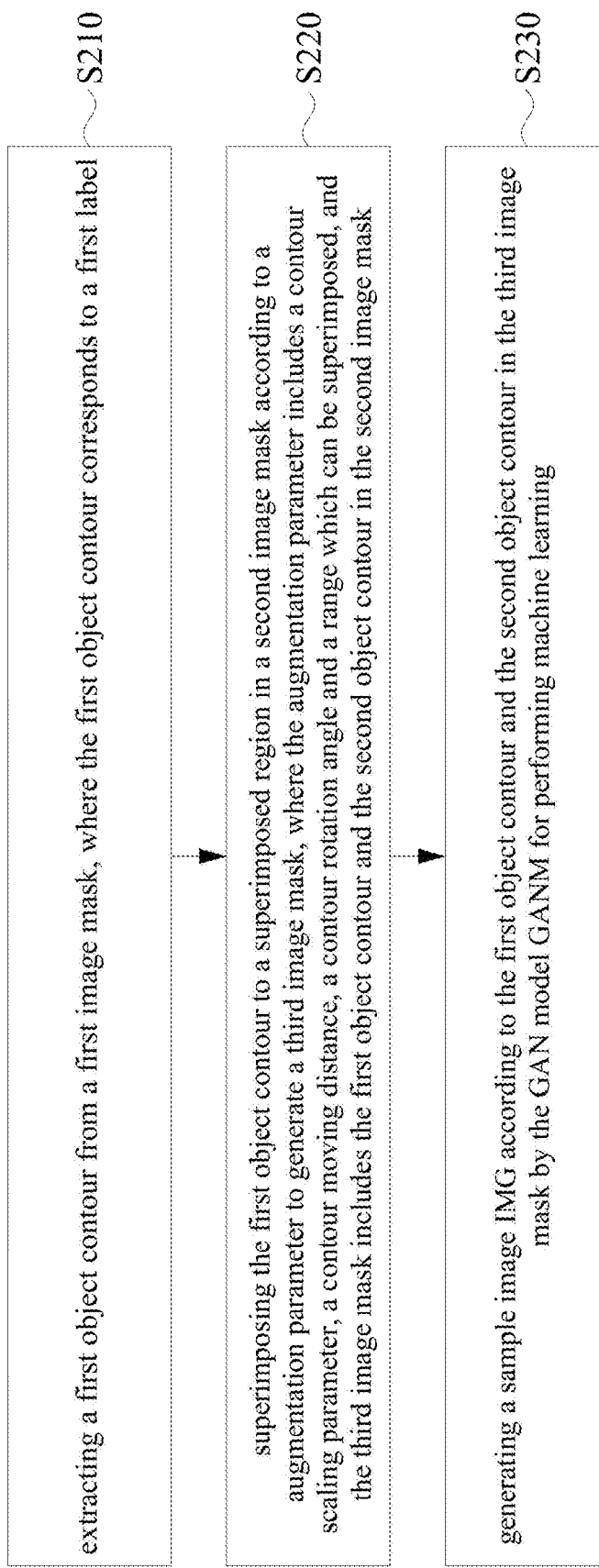
FIG. 2 is a flowchart of an image augmentation method in the present disclosure.

Referring to FIG. 2 together, FIG. 2 is a flowchart of an image augmentation method, and the image augmentation device 100 shown in FIG. 1 can be used to perform all steps in an image augmentation method in FIG. 2.

As shown in FIG. 2, firstly, in step S210, a first object contour is extracted from a first image mask, where the first object contour corresponds to a first label.

In some embodiments, the first image mask can be any one of the image masks MSK(1)-MSK(N). In some embodiments, the first label is a weight corresponding to an object type of the first object contour. For example, when the first object contour is a contour of a tree, the first label can be a weight of the tree.

Furthermore, in step S220, the first object contour is superimposed to a superimposed region in a second image mask according to the augmentation parameter to generate a third image mask, where the augmentation parameter includes a contour scaling parameter, a contour moving distance, a contour rotation angle and a range which can be superimposed, and the third image mask includes the first object contour and the second object contour in the second image mask.

In some embodiments, the second image mask can be any one of the image masks MSK(1)-MSK(N) that is different from the first image mask. In some embodiments, the third image mask is a new image mask NEW_MSK generated by the mask augmentation model MAM by superimposing the first object contour to the superimposed region in the second image mask according to the augmentation parameter. In some embodiments, the first object contour and the second object contour can be contours of objects of any object type (e.g., contours of trees). In some embodiments, the object type of the second object contour can be different or the same as the object type of the first object contour. For example, the object type of the first object contour is a tree, and the object type of the second object contour is a person. In another example, the object type of the first object contour and the object type of the second object contour are vehicles. In other words, a weight of a second label corresponding to the second object contour can be the same as or different from the weight of the first label.

In some embodiments, when both the first image mask and the second image mask are binary masks, the superimposed regions in the first object contour, the second object contour and the second image mask can be perform element-wise multiplication operation according to corresponding classification values respectively, thereby superimposing the first object contour to the superimposed region in the second image mask, where these classification values are respectively related to the object types of the first object contour, the second object contour and the superimposed region in the second image mask.

For example, when the superimposing region in the first object contour and the second image mask are iris and sclera respectively, a classification value of the iris can be 2, and a classification value of the sclera can be 1.5. It should be noted that these classification values can be pre-stored in the memory 110 or pre-set by the user.

In some embodiments, the contour scaling parameter, the contour moving distance, the contour rotation angle and a range which can be superimposed are related to the object type of the first object contour. For example, the object type of the first object contour is taken as a person as an example. At this time, the contour scaling parameter is a zoom ratio of the person, the contour moving distance is horizontal and vertical moving distances of the person, the contour rotation angle is a clockwise rotation angle of the person, and the range which can be superimposed is a region range that the person can be superimposed to in the second image mask, where height of a scaled person is not more than height of the tree in the second image mask, a rotated person cannot be upside down, and a moved person cannot be superimposed to non-road position in the second image mask (e.g., in sky). In this way, the superimposed region of the person in the second image mask can be identified.

In some embodiments, the first object contour can be scaled proportionally according to the contour scaling parameter, and the first object contour is rotated according to the contour rotation angle. Then, a coordinate of the first object contour in the first image mask is moved horizontally and vertically according to the contour moving distance to generate a coordinates of the first object contour in the second image mask. When determining that the coordinate of the first object contour in the second image mask is within the range which can be superimposed, the first object contour which is changed geometrically can be superimposed on a position of the coordinate of the first object contour in the second image mask.

In contrary, when determining that the coordinate of the first object contour in the second image mask is outside the range which can be superimposed, the contour moving distance can be readjusted. Until the coordinate of the first object contour in the second image mask are within the range which can be superimposed, the first object contour which is changed geometrically is superimposed to the coordinate of the first object contour in the second image mask.

It should be noted that the augmentation parameter can be adjusted according to relationship between various object types and contours of various objects in the image mask. In addition, the above-mentioned coordinates can be barycentric coordinates or centroid coordinates.

Furthermore, in step S230, a sample image IMG is generated according to the first object contour and the second object contour in the third image mask by the GAN model GANM for performing machine learning.

In some embodiments, the memory 110 can further store multiple preset masks and multiple preset images corresponding to the multiple preset masks, where these preset masks and these preset images are different from the above image masks MSK(1)-MSK(N) and the sample image IMG, where these preset masks and these preset images are only used in a pre-training stage, and not to be used when a large quantity of the sample images IMG need to be generated.

In some embodiments, the GAN model GANM can be generated according to the multiple preset masks and the multiple preset images corresponding to the multiple preset masks, thereby generating the sample image IMG according to the third image mask by the GAN model GANM, where the GAN model GANM includes a generator model (not shown) and a discriminator model (not shown), where the generator model includes multiple encoding layers (not shown) and multiple decoding layers (not shown), and the multiple encoding layers are connected to the multiple decoding layers by a skip connection method. It should be noted that training of the GAN model GANM is completed in the pre-training stage. Therefore, in the usage stage, a small quantity of the image masks MSK(1)-MSK(N) can be directly used to generate a large quantity of sample images IMG through the mask augmentation model MAM and the GAN model GANM.

In some embodiments, the first object contour can be superimposed to the superimposed region in the first image mask according to the augmentation parameter to generate a fourth image mask, where the fourth image mask includes the first object contour and the first object contour which is superposed to. Then, the sample image IMG can be generated according to the first object contour and the first object contour which is superposed to in the fourth image mask by the GAN model GANM for performing machine learning. In other words, the fourth image mask can include the two first object contour, and the fourth image mask can also be used to generate the sample image IMG.

In the above-mentioned embodiments, although the superimposing between the two image masks is used for illustration, in practical applications, more than two image masks can be superimposed to generate the large quantity of sample images IMG. For example, multiple object contours can be extracted from multiple image masks, and the multiple object contours can be superimposed to any one or more of the multiple image masks.

Through the above steps, the image augmentation device 100 can perform mask augmentation according to the small quantity of image masks MSK(1)-MSK(N) to generate the large quantity of sample images IMG. In this way, effect of using a small quantity of labeled samples to maintain integrity of the training data can be achieved.

The training of the GANM in the preprocessing stage and the implementation of the GANM in this disclosure will be further described with specific examples.

Figure 3:
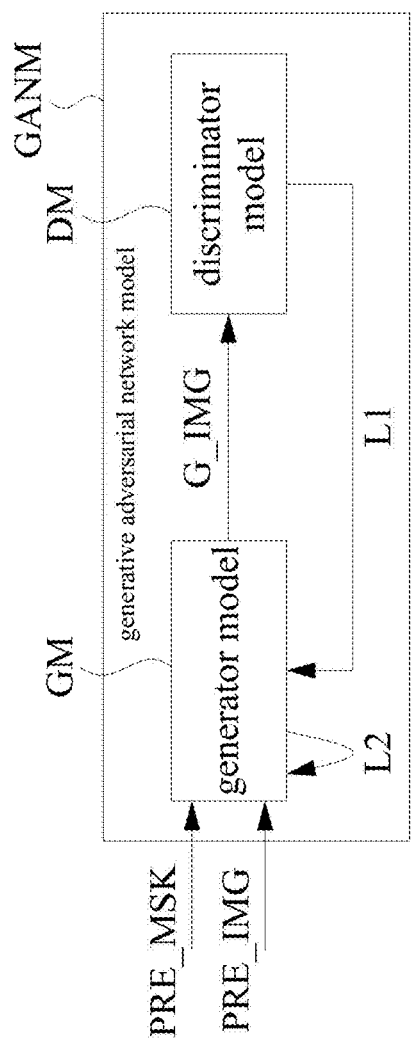
FIG. 3 is a schematic diagram of a generative adversarial network model in a training phase according to some embodiments of the present disclosure.

Referring to FIG. 3 together, FIG. 3 is a schematic diagram of the GAN model GANM in the training phase according to some embodiments of the present disclosure. As shown in FIG. 3, the GAN model GANM can include the generator model GM and the discriminator model DM, where the generator model GM is connected to the discriminator model DM.

In the pre-training stage, the generator model GM can be used to generate the generated image G_IMG according to the preset mask PRE_MSK, and transmit the generated image G_IMG to the discriminator model DM. Then, the generator model GM can calculate a first loss L1 according to the generated image G_IMG and the preset image PRE_IMG. Then, the discriminator model DM can calculate a second loss L2 according to the preset image PRE_IMG, the preset mask PRE_MSK and the generated image G_IMG generated by the generator model GM, and perform back propagation algorithm according to a second loss L2 algorithm to adjust the parameter in the discriminator model DM. Then, the generator model GM can perform the back-propagation algorithm according to the first loss L1 and the second loss L2 to adjust the parameter in the generator model GM. In this way, the parameter in the discriminator model DM and the parameter in the generator model GM can be continuously adjusted until the discriminator model DM can maximize the determining that the generated image G_IMG generated by the generator model GM is a real image and maximize the determining that the preset image PRE_IMG is the real image, and the training of the GAN model GANM can be completed. It should be noted that, the above-mentioned operations of the first loss L1 and the second loss L2 can be L1 distance operation, L2 distance operation, mathematical operation of Charbonnier distance or a combination thereof.

Figure 4:
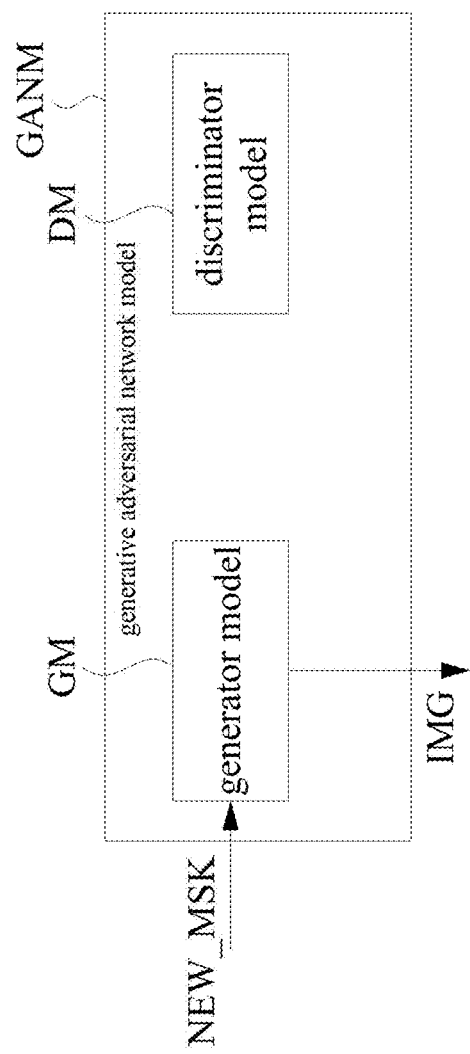
FIG. 4 is a schematic diagram of the generative adversarial network model in a usage phase according to some embodiments of the present disclosure.

Referring to FIG. 4 together, FIG. 4 is a schematic diagram of the GAN model GANM in the usage phase according to some embodiments of the present disclosure. As shown in FIG. 4, in the usage phase, it is only necessary to input a large quantity of new image masks NEW_MSK generated by the mask augmentation module MAM into the generator module GM in the pre-trained GAN model GANM, and then a large quantity of sample images IMG respectively corresponding to a large quantity of new image masks NEW_MSK can be generated.

Figure 5:
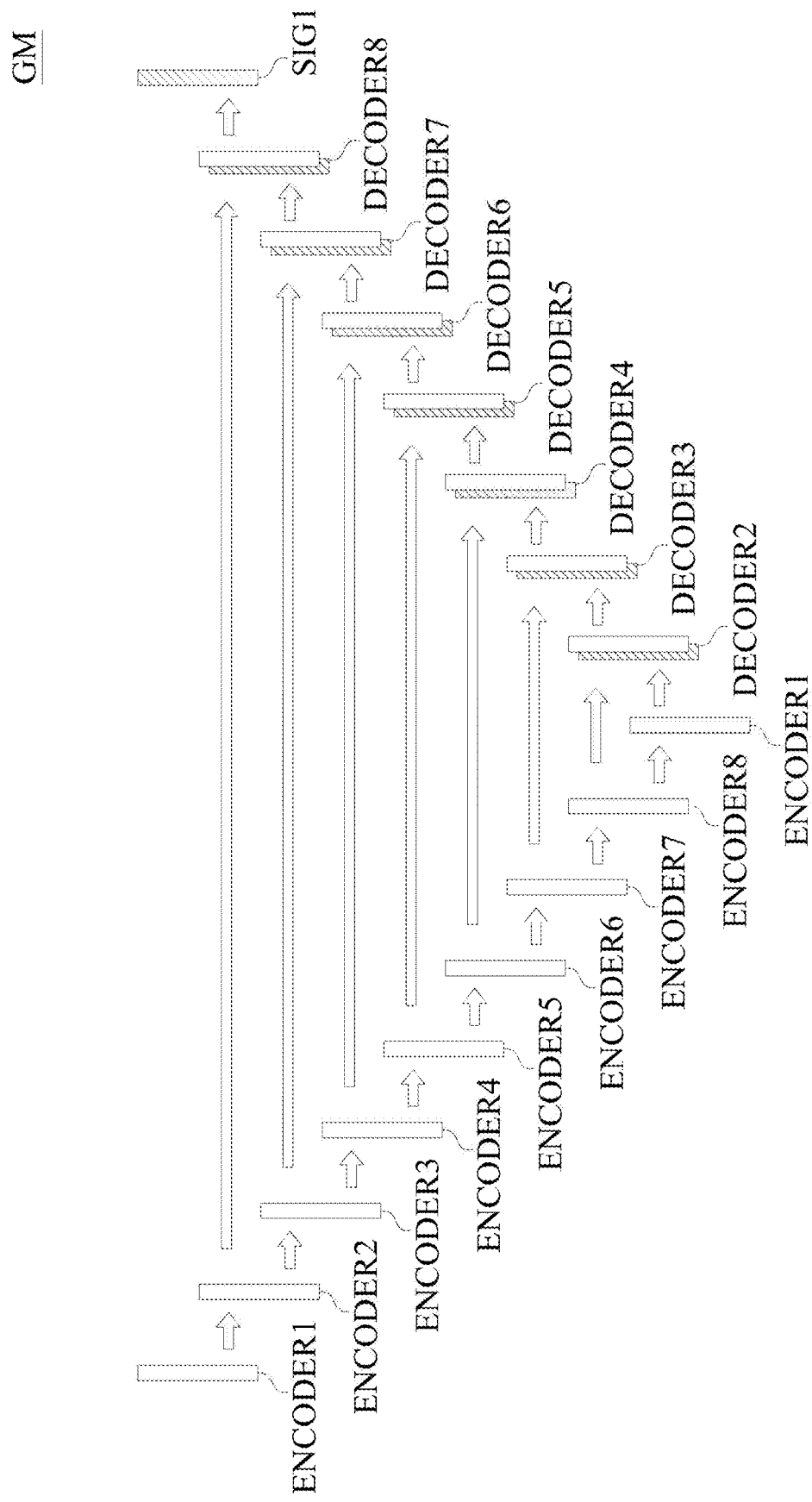
FIG. 5 is a schematic diagram of an internal architecture of a generator model according to some embodiments of the present disclosure.

Referring to FIG. 5 together, FIG. 5 is a schematic diagram of an internal architecture of the generator model GM according to some embodiments of the present disclosure. As shown in FIG. 5, the generator model GM is a U-Net model, and the generator model GM includes 8 encoding layers ENCODER1-ENCODER8, 8 decoding layers DECODER1-DECODER8, and 1 sigmoid layer SIG1, where the encoding layers ENCODER2-ENCODER8 are sequentially connected to DECODER8-DECODER2 by skip connection method.

It should be noted that although the 8 coding layers and the 8 decoding layers are taken as an example here, the quantities of coding layers and decoding layers can also be adjusted according to different requirements.

In detail, the encoding layers ENCODER1-ENCODER8 are convolutional layers, and the decoding layers DECODER1-DECODER8 are deconvolutional layers, where the convolutional layers ENCODER1-ENCODER8 perform convolution processing (e.g., Conv2D function), normalization processing (e.g., InstanceNorm function) and LeakyReLU function processing.

Furthermore, the deconvolution layers DECODER1-DECODER8 perform deconvolution processing (e.g., ConvTranspose2D function), normalization processing (e.g., InstanceNorm function) and ReLU function processing.

In addition, the sigmoid layer SIG1 performs upsampling processing (e.g., UpSample2D function), zero-pad processing (e.g., ZeroPad function), convolution processing (e.g., Conv2D function), and sigmoid processing.

Figure 6:
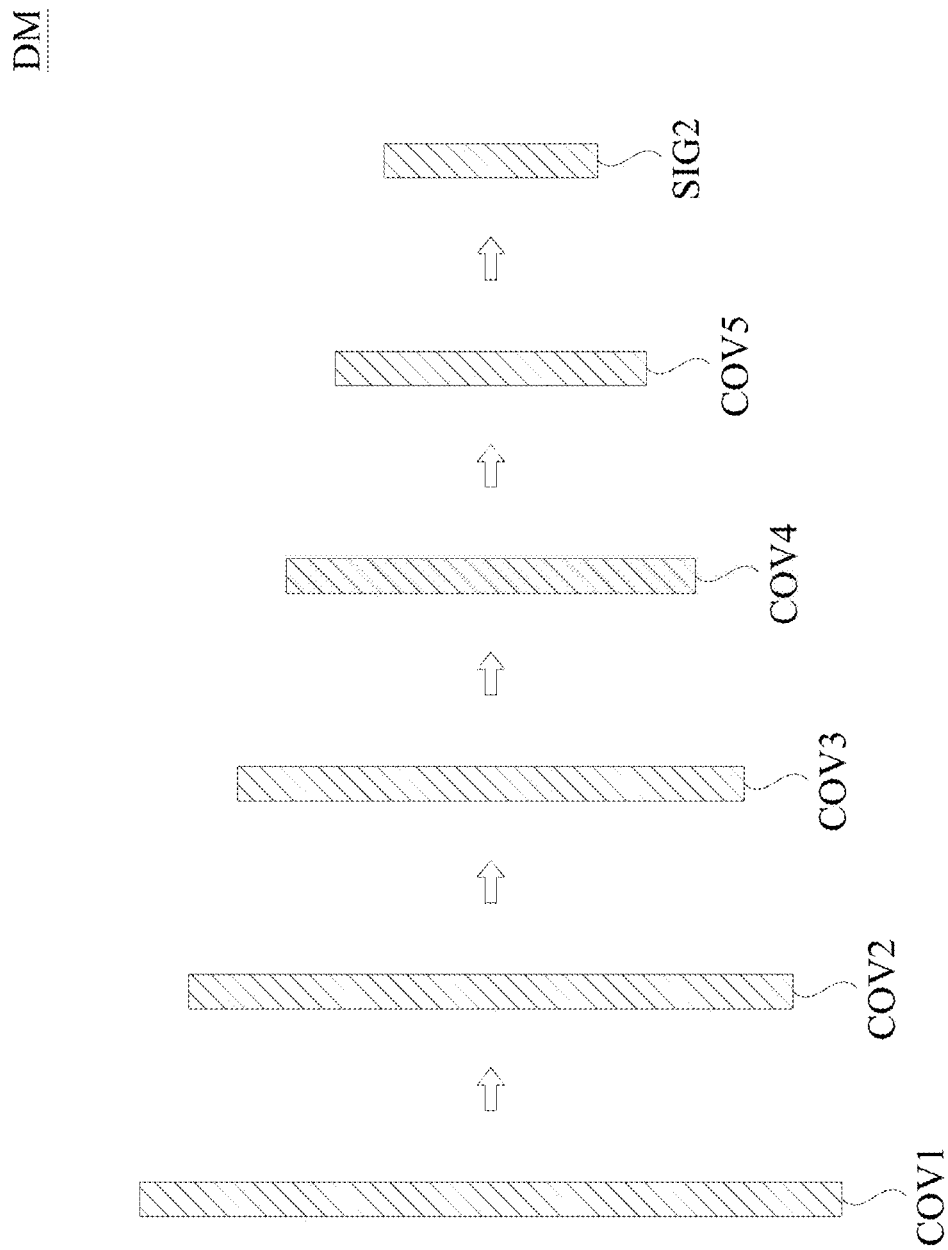
FIG. 6 is a schematic diagram of an internal architecture of a discriminator model according to some embodiments of the present disclosure.

Referring to FIG. 6 together, FIG. 6 is a schematic diagram of an internal architecture of the discriminator model DM according to some embodiments of the present disclosure. As shown in FIG. 6, the discriminator model DM includes 8 convolutional layers COV1-COV5 and 1 sigmoid layer SIG2. It should be noted that although 8 convolutional layers are taken as an example here, the quantity of convolutional layers can also be adjusted according to different requirements.

In detail, the convolution layer in the discriminator model DM performs convolution processing (e.g., Conv2D function), normalization processing (e.g., InstanceNorm function), and LeakyReLU function processing.

Also, the sigmoid layer SIG2 performs zero pad processing (e.g., ZeroPad function), convolution processing (e.g., Conv2D function), and sigmoid processing.

With the structure of the generator model GM and the discriminator model DM and the way of skip connections, clarity of the sample image IMG generated by the GAN model GANM can be greatly improved.

The operation of mask augmentation performed on different types of masks will be described below with practical examples.

Figure 7:
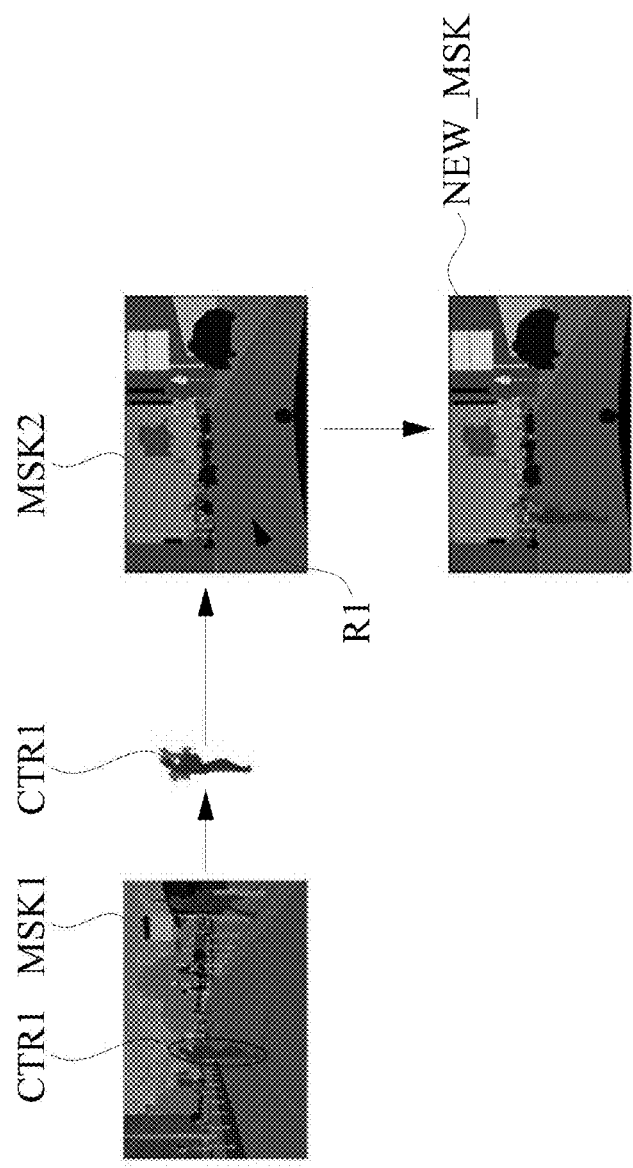
FIG. 7 is a schematic diagram of augmenting multiple degree of freedom (DOF) masks according to some embodiments of the present disclosure.

Referring to FIG. 7 together, FIG. 7 is a schematic diagram of augmenting multiple DOF masks MSK1-MSK2 according to some embodiments of the present disclosure. As shown in FIG. 7, an object contour CTR1 can be extracted from the multiple DOF mask MSK1, where the object contour CTR1 corresponds to a grayscale value (which can be regarded as a label or a weight).

Furthermore, based on the augmentation parameter of the object contour CTR1, the object contour CTR1 can be reduced by 0.8 times, and a barycentric coordinate of the object contour CTR1 in the multiple DOF mask MSK1 can be moved horizontally by −30 pixel units and moved vertically by −30 Pixel units. In this way, the barycentric coordinate of the object contour CTR1 after movement can be found in the multiple DOF mask MSK2.

For example, when the barycentric coordinate of the object contour CTR1 in the multiple DOF mask MSK1 are a coordinate (305, 206), the barycentric coordinate can be moved to a coordinate (275, 176). In this way, the coordinate (275, 176) can be found in the multiple DOF mask MSK2, and this coordinate can be used as the barycentric coordinate of the object contour CTR1 after movement.

Furthermore, whether a moved barycentric coordinate of the object contour CTR1 is located in a range R1 which can be superimposed in the multiple DOF mask MSK2 can be determined, where the range R1 which can be superimposed corresponds to an object type (i.e., a person) of the object contour CTR1. At this time, the moved barycentric coordinate of the object contour CTR1 is indeed within the range R1 which can be superimposed in the multiple DOF mask MSK2. Therefore, the object contour CTR1 which is processed geometrically can be superimposed to the above-mentioned moved barycentric coordinate (i.e., superimposed position) in the multiple DOF mask MSK2 to generate a new image mask NEW_MSK.

Figure 8:
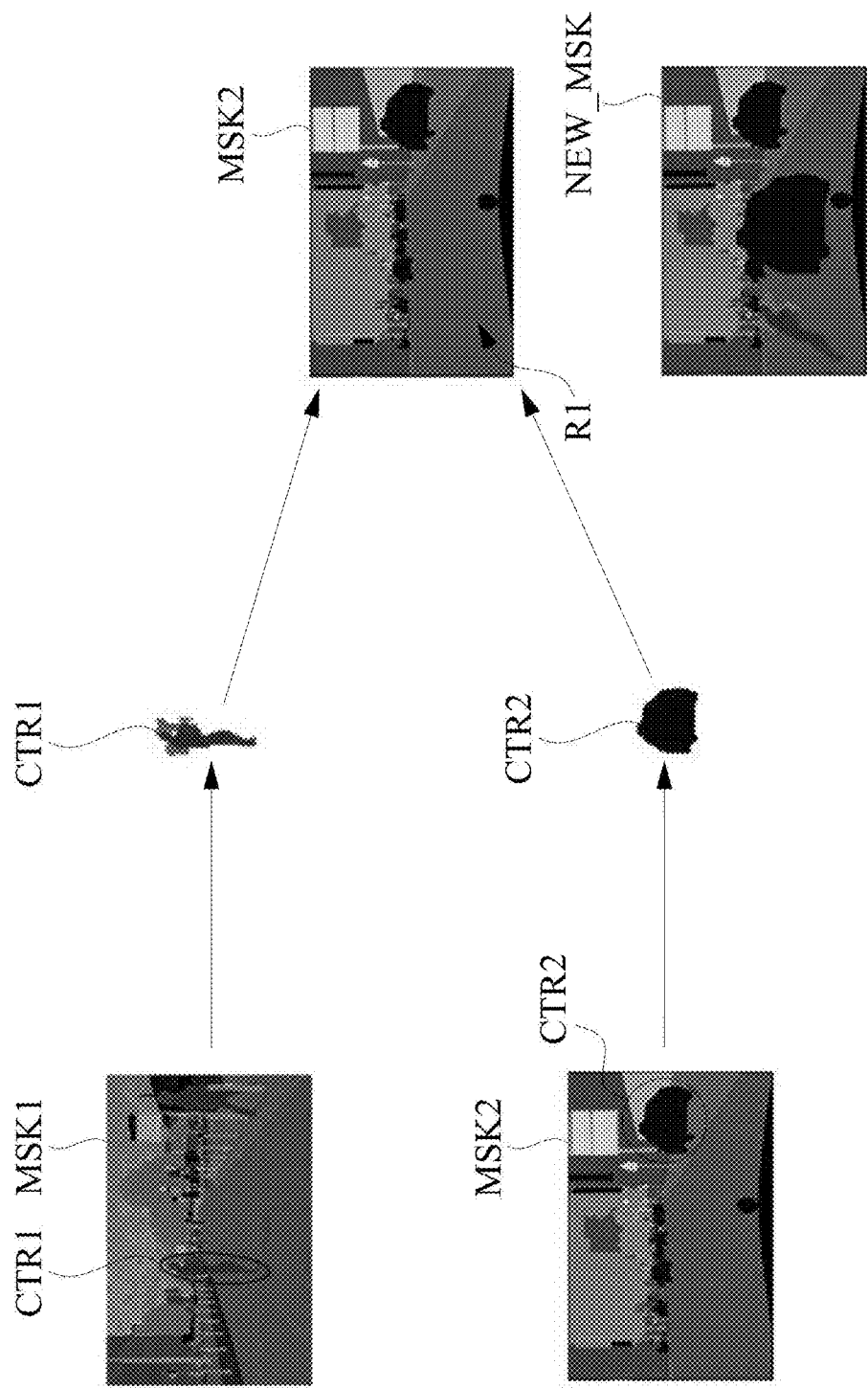
FIG. 8 is a schematic diagram of augmenting multiple degree of freedom masks according to other embodiments of the present disclosure.

Referring to FIG. 8 together, FIG. 8 is a schematic diagram of augmenting multiple DOF masks MSK1-MSK2 according to other embodiments of the present disclosure. As shown in FIG. 8, object contours CTR1-CTR2 can be extracted from the multiple DOF masks MSK1-MSK2 respectively, where the object contours CTR1-CTR2 can correspond to different grayscale values respectively.

Furthermore, based on the augmentation parameter of the object contour CTR1, the object contour CTR1 is enlarged by 1.2 times, the object contour CTR1 is rotated 90 degrees, and a barycentric coordinate of the object contour CTR1 in the multiple DOF mask MSK1 are moved horizontally by −50 pixels units and move vertically −40 pixel units. Therefore, a barycentric coordinate of the object contour CTR1 after movement can be found in the multiple DOF mask MSK2.

Furthermore, whether a moved barycentric coordinate of the object contour CTR1 is located in a range R1 which can be superimposed in the multiple DOF mask MSK2 can be determined, where the range R1 which can be superimposed corresponds to an object type of the object contour CTR1 (i.e., the person can be superimposed suitable for a road surface). At this time, the moved barycentric coordinate of the object contour CTR1 is indeed within the range R1 which can be superimposed in the multiple DOF mask MSK2.

Furthermore, based on the augmentation parameter of the object contour CTR2, the object contour CTR2 is enlarged by 1.8 times, and a barycentric coordinate of the object contour CTR2 in the multiple DOF mask MSK2 are moved horizontally by −40 pixel units and moved vertically by −30 pixels units. Therefore, the barycentric coordinate of the object contour CTR2 after movement can be found in the multiple DOF mask MSK2.

Furthermore, whether the moved barycentric coordinate of the object contour CTR2 is located in a range R1 which can be superimposed in the multiple DOF mask MSK2 can be determined, where the range R1 which can be superimposed also corresponds to an object type of the object contour CTR2 (i.e., a vehicle can superimposed on the road surface). At this time, the moved barycentric of the object contour CTR2 are indeed within the range R1 which can be superimposed in the multiple DOF mask MSK2.

Therefore, the object contours CTR1-CTR1 which are processed geometrically can be superimposed to the above-mentioned respective moved barycentric coordinates in the multiple DOF mask MSK2 to generate a new image mask NEW_MSK.

Figure 9:
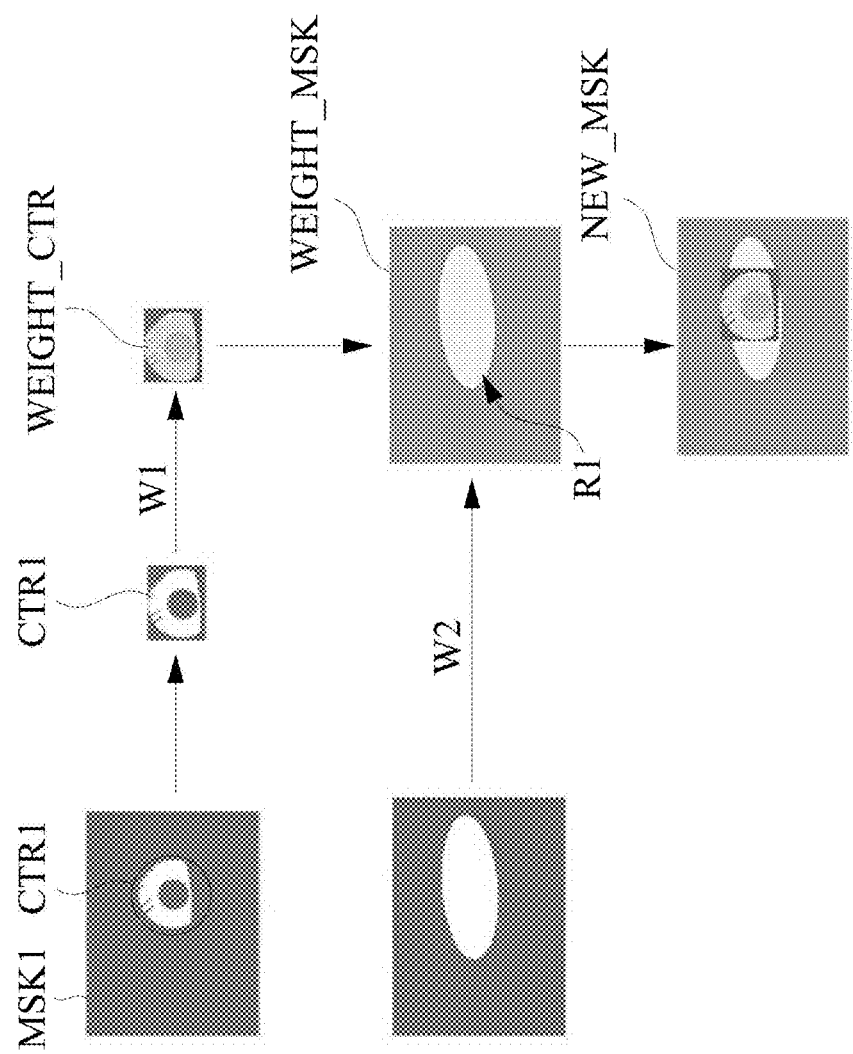
FIG. 9 is a schematic diagram of augmenting binary masks according to some embodiments of the present disclosure.

Referring to FIG. 9 together, FIG. 9 is a schematic diagram of augmenting binary masks MSK1-MSK2 according to some embodiments of the present disclosure. As shown in FIG. 9, an object contour CTR1 can be extracted from the binary mask MSK1, where the object contour CTR1 corresponds to a binary value representing an object (e.g., the object can be a black and white value with a value of 1 or a higher one of a pair of grayscale values). In this embodiment, the object contour CTR1 is the contour of the iris.

Furthermore, based on the augmentation parameter of the object contour CTR1, no geometric change or movement is performed on the object contour CTR1. In this way, a barycentric coordinate of the object contour CTR1 can be found in the binary mask MSK2.

Furthermore, it can be determined whether the barycentric coordinate of the object contour CTR1 is located in a range R1 which can be superimposed in the binary mask MSK2, where the range R1 which can be superimposed corresponds to an object type (i.e. iris) of the object contour CTR1. In this embodiment, a region of the eyeball in the binary mask MSK2 is the range R1 which can be superimposed, and this range R1 which can be superimposed corresponds to the same binary value as the above-mentioned binary value.

At this time, the barycentric coordinate of the object contour CTR1 is indeed located in the range R1 which can be superimposed in the binary mask MSK2. Since both the object contour CTR1 and the range R1 which can be superimposed have the same binary value, multiplying the binary values of all pixels in the object contour CTR1 by a classification value W1 corresponding to the object contour CTR1 is necessary, and multiplying the binary values of all pixels in the range R1 which can be superimposed of the binary mask MSK2 by a classification value W2 corresponding to the range R1 which can be superimposed is necessary. In this embodiment, the classification value W1 corresponding to the object contour CTR1 is a classification value of the iris, and the classification value W2 corresponding to the range R1 which can be superimposed is a classification value of the eyeball, where these classification values W1-W2 can be preset by the user. Therefore, an object contour WEIGHT_CTR performed multiplication processing can be superimposed on the barycentric coordinate in a binary mask WEIGHT_MSK performed multiplication processing to generate a new image mask NEW_MSK.

On the other hand, at the implementation level, the image augmentation method disclosed in this disclosure can be used in various fields with machine vision, image classification, data prediction or data classification, etc. For example, this image augmentation method can be used to classify labeled data in medical images, such as to generate normal, pneumonia, bronchitis, heart disease X-ray images, or to generate normal Ultrasound images of fetus and fetal malposition. In addition, this image augmentation method can also be used in the generation of images collected by autonomous driving, such as generating images of normal roads, roads with obstacles, and other vehicles. There are other machine learning fields similar to this that requires a large quantity of data. For example, the image augmentation method disclosed in this disclosure can also be used in other fields related to machine learning, such as sound spectrum recognition, spectrum recognition, big data analysis, and data feature recognition.

In summary, the image augmentation device provided by the present disclosure can generate a large quantity of labeled masked images according to a small quantity of image masks. In addition, a large quantity of image masks can be generated from a small quantity of image masks to generate a large quantity of labeled images using a pre-trained GAN model. In this way, the effect of using a small quantity of labeled samples to maintain the integrity of the training data can be easily achieved.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. An image augmentation device, comprising:
   a memory, configured for storing a first image mask and a second image mask; and
   a processor, connected to the memory to perform following operations:
      extracting a first object contour from the first image mask, wherein the first object contour corresponds to a first label;
      superimposing the first object contour to a superimposed region in the second image mask according to an augmentation parameter to generate a third image mask, wherein the augmentation parameter comprises a contour scaling parameter, a contour moving distance, a contour rotation angle and a range which can be superimposed, and the third image mask comprises the first object contour and a second object contour in the second image mask; and
      generating a sample image which corresponds to according to the first object contour and the second object contour in the third image mask by a generative adversarial network model for performing machine learning.

2. The image augmentation device of claim 1, wherein the contour scaling parameter, the contour moving distance, the contour rotation angle and the range which can be superimposed are related to an object type of the first object contour.

3. The image augmentation device of claim 1, wherein the processor is further configured for:
   scaling proportionally the first object contour according to the contour scaling parameter, and rotating the first object contour according to the contour rotation angle;
   moving horizontally and vertically a coordinate of the first object contour in the first image mask according to the contour moving distance to generate a coordinate of the first object contour in the second image mask; and
   determining whether the coordinate of the first object contour in the second image mask is within the range which can be superimposed, thereby superimposing the first object contour on a position of the coordinate of the first object contour in the second image mask.

4. The image augmentation device of claim 3, wherein the processor is further configured for:
   when determining that the coordinate of the first object contour in the second image mask is outside the range which can be superimposed, readjusting the contour moving distance until the coordinate of the first object contour in the second image mask are within the range which can be superimposed; and
   when determining that the coordinate of the first object contour in the second image mask is within the range which can be superimposed, superimposing the first object contour on the position of the coordinate of the first object contour in the second image mask.

5. The image augmentation device of claim 1, wherein the first image mask and the second image mask are binary masks, wherein the processor is further configured for:
   performing an element-wise multiplication operation on the first object contour, the second object contour and the superimposed region according to a plurality of classification values corresponding to the first object contour, the second object contour, and the superimposed region, thereby superimposing the first object contour to the superimposed region in the second image mask,
   wherein the plurality of classification values are respectively related to an object type of the first object contour, an object type of the second object contour, and an object type of the superimposed region.

6. The image augmentation device of claim 1, wherein the processor is further configured for:
   training the generative adversarial network model according to a plurality of preset masks and a plurality of preset images corresponding to the plurality of preset masks, thereby generating the sample image according to the third image mask by the generative adversarial network model, wherein the generative adversarial network model comprises a generator model and a discriminator model, wherein the generator model comprises a plurality of encoding layers and a plurality of decoding layers, and the plurality of encoding layers are connected to the plurality of decoding layers by a skip connection method.

7. The image augmentation device of claim 1, wherein the processor is further configured for:
   superimposing the first object contour to the superimposed region in the first image mask according to the augmentation parameter to generate a fourth image mask, wherein the fourth image mask comprises the first object contour and a first object contour which is superimposed to the superimposed region; and
   generating another sample image by the generative adversarial network model according to the first object contour and the first object contour which is superimposed to the superimposed region in the fourth image mask for performing the machine learning.

8. An image augmentation method, comprising:
   extracting a first object contour from a first image mask, wherein the first object contour corresponds to a first label;
   superimposing the first object contour to a superimposed region in a second image mask according to an augmentation parameter to generate a third image mask, wherein the augmentation parameter comprises a contour scaling parameter, a contour moving distance, a contour rotation angle and a range which can be superimposed, and the third image mask comprises the first object contour and a second object contour in the second image mask; and
   generating a sample image which corresponds to according to the first object contour and the second object contour in the third image mask by a generative adversarial network model for performing machine learning.

9. The image augmentation method of claim 8, wherein the contour scaling parameter, the contour moving distance, the contour rotation angle and the range which can be superimposed are related to an object type of the first object contour.

10. The image augmentation method of claim 8, wherein the image augmentation method further comprises:
scaling proportionally the first object contour according to the contour scaling parameter, and rotating the first object contour according to the contour rotation angle;
moving horizontally and vertically a coordinate of the first object contour in the first image mask according to the contour moving distance to generate a coordinate of the first object contour in the second image mask; and
determining whether the coordinate of the first object contour in the second image mask is within the range which can be superimposed, thereby superimposing the first object contour on a position of the coordinate of the first object contour in the second image mask.

11. The image augmentation method of claim 10, wherein the image augmentation method further comprises:
when determining that the coordinate of the first object contour in the second image mask is outside the range which can be superimposed, readjusting the contour moving distance until the coordinate of the first object contour in the second image mask are within the range which can be superimposed; and
when determining that the coordinate of the first object contour in the second image mask is within the range which can be superimposed, superimposing the first object contour on the position of the coordinate of the first object contour in the second image mask.

12. The image augmentation method of claim 8, wherein the first image mask and the second image mask are binary masks, wherein the image augmentation method further comprises:
performing an element-wise multiplication operation on the first object contour, the second object contour and the superimposed region according to a plurality of classification values corresponding to the first object contour, the second object contour, and the superimposed region, thereby superimposing the first object contour to the superimposed region in the second image mask,
wherein the plurality of classification values are respectively related to an object type of the first object contour, an object type of the second object contour, and an object type of the superimposed region.

13. The image augmentation method of claim 8, further comprising:
training the generative adversarial network model according to a plurality of preset masks and a plurality of preset images corresponding to the plurality of preset masks, thereby generating the sample image according to the third image mask by the generative adversarial network model, wherein the generative adversarial network model comprises a generator model and a discriminator model, wherein the generator model comprises a plurality of encoding layers and a plurality of decoding layers, and the plurality of encoding layers are connected to the plurality of decoding layers by a skip connection method.

14. The image augmentation method of claim 8, further comprising:
superimposing the first object contour to the superimposed region in the first image mask according to the augmentation parameter to generate a fourth image mask, wherein the fourth image mask comprises the first object contour and a first object contour which is superimposed to the superimposed region; and
generating another sample image by the generative adversarial network model according to the first object contour and the first object contour which is superimposed to the superimposed region in the fourth image mask for performing the machine learning.

15. An image augmentation device, comprising:
a memory, configured for storing a first image mask; and
a processor, connected to the memory to perform following operations:
extracting a first object contour from the first image mask, wherein the first object contour corresponds to a first label;
superimposing the first object contour to a superimposed region in the first image mask according to an augmentation parameter to generate a second image mask, wherein the augmentation parameter comprises a contour scaling parameter, a contour moving distance, a contour rotation angle and a range which can be superimposed, and the second image mask comprises the first object contour and a first object contour which is superimposed to the superimposed region; and
generating a sample image which corresponds to according to the first object contour and the first object contour which is superimposed to the superimposed region in the second image mask by a generative adversarial network model for performing machine learning.

16. The image augmentation device of claim 15, wherein the contour scaling parameter, the contour moving distance, the contour rotation angle and the range which can be superimposed are related to an object type of the first object contour.

17. The image augmentation device of claim 15, wherein the processor is further configured for:
scaling proportionally the first object contour according to the contour scaling parameter, and rotating the first object contour according to the contour rotation angle;
moving horizontally and vertically a first coordinate of the first object contour in the first image mask according to the contour moving distance to generate a second coordinate which the first object contour is superimposed to in the first image mask; and
determining whether the second coordinate is within the range which can be superimposed, thereby superimposing the first object contour on a position of the second coordinate in the first image mask.

18. The image augmentation device of claim 17, wherein the processor is further configured for:
when determining that the second coordinate is within the range which can be superimposed, superimposing the first object contour to the position of the second coordinate.

19. The image augmentation device of claim 15, wherein the first image mask and the second image mask are binary masks, wherein the processor is further configured for:
performing an element-wise multiplication operation on the first object contour and the superimposed region according to a plurality of classification values corresponding to the first object contour and the superimposed region, thereby superimposing the first object contour to the superimposed region in the first image mask,
wherein the plurality of classification values are respectively related to an object type of the first object contour and an object type of the superimposed region.

20. The image augmentation device of claim 15, wherein the processor is further configured for:
training the generative adversarial network model according to a plurality of preset masks and a plurality of preset images corresponding to the plurality of preset masks, thereby generating the sample image according to the second image mask by the generative adversarial network model, wherein the generative adversarial network model comprises a generator model and a discriminator model, wherein the generator model comprises a plurality of encoding layers and a plurality of decoding layers, and the plurality of encoding layers are connected to the plurality of decoding layers by a skip connection method.

* * * * *